United States Patent
Hisakuni et al.

(10) Patent No.: US 12,098,976 B2
(45) Date of Patent: Sep. 24, 2024

(54) STRUCTURE EVALUATION SYSTEM AND STRUCTURE EVALUATION METHOD

(71) Applicant: KABUSHIKI KAISHA TOSHIBA, Tokyo (JP)

(72) Inventors: Yousuke Hisakuni, Sagamihara Kanagawa (JP); Hidefumi Takamine, Shinagawa Tokyo (JP); Yuki Ueda, Yokohama Kanagawa (JP); Keisuke Ueno, Kawasaki Kanagawa (JP); Takashi Usui, Saitama Saitama (JP); Kazuo Watabe, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/929,482

(22) Filed: Sep. 2, 2022

(65) Prior Publication Data
US 2023/0194382 A1    Jun. 22, 2023

(30) Foreign Application Priority Data
Dec. 20, 2021    (JP) ................. 2021-205702

(51) Int. Cl.
*G01M 5/00* (2006.01)
*G01M 7/08* (2006.01)

(52) U.S. Cl.
CPC ........ *G01M 5/0066* (2013.01); *G01M 5/0008* (2013.01); *G01M 7/08* (2013.01)

(58) Field of Classification Search
CPC ................. G01N 29/045; G01N 29/14; G01N 2291/0258; G01N 2291/0232;
(Continued)

(56) References Cited

U.S. PATENT DOCUMENTS 6,170,334 B1 *  1/2001  Paulson ............... G01H 1/00
                                                  73/594
8,626,459 B2 *  1/2014  Di Scalea ........... G01N 29/043
                                                  702/56

(Continued)

FOREIGN PATENT DOCUMENTS

EP           3 290 915 A1    3/2018
JP           2015-219076 A   12/2015

(Continued)

OTHER PUBLICATIONS

Japan Patent Office, Office Action in JP 2021-205702, 6 pages, and machine translation, 6 pages (Aug. 6, 2024).

*Primary Examiner* — Giovanni Astacio-Oquendo
*Assistant Examiner* — Martin Walter Braunlich
(74) *Attorney, Agent, or Firm* — Finnegan, Henderson, Farabow, Garrett & Dunner, LLP

(57) ABSTRACT

According to one embodiment, a structure evaluation system includes an impact imparting unit, a plurality of sensors, a position locator, and an evaluator. The impact imparting unit applies impacts to a second region different from a first region of a structure to which traveling sections of a vehicle, which travels on the structure, apply impacts. The plurality of sensors detect elastic waves generated in the structure. The position locator locates a position of a source of the elastic waves on the basis of the elastic waves detected by each of the plurality of sensors. The evaluator evaluates a deterioration state of the structure on the basis of a position location result of the position locator.

3 Claims, 10 Drawing Sheets

(58) Field of Classification Search
CPC ......... G01N 29/043; G01N 2291/0289; G01N 29/341; G01N 29/4445; G01N 2291/106; G01N 29/2437; G01N 2291/044; G01N 29/2475; G01M 5/0066; G01M 5/0008; G01M 7/08
See application file for complete search history.

(56) References Cited

U.S. PATENT DOCUMENTS

| | | | |
|---|---|---|---|
| 10,620,085 B2* | 4/2020 | Zhang | G01H 1/14 |
| 2009/0173137 A1 | 7/2009 | Halliday | |
| 2019/0383696 A1* | 12/2019 | Shiotani | G01N 29/4463 |
| 2020/0300813 A1* | 9/2020 | Mazzeo | G01N 29/34 |
| 2021/0072193 A1* | 3/2021 | Bobusch | G01N 29/222 |

FOREIGN PATENT DOCUMENTS

| | | |
|---|---|---|
| JP | 2020-118622 A | 8/2020 |
| WO | WO 2017/217034 A1 | 12/2017 |
| WO | WO 2019/167137 A1 | 9/2019 |
| WO | WO 2022/014004 A1 | 1/2022 |

* cited by examiner

NEWLY ADDED WAVE RAYS WL

NEWLY ADDED WAVE RAYS WL

STRUCTURE EVALUATION SYSTEM AND STRUCTURE EVALUATION METHOD

CROSS-REFERENCE TO RELATED APPLICATION

This application is based upon and claims the benefit of priority from Japanese Patent Application No. 2021-205702, filed Dec. 20, 2021; the entire contents of which are incorporated herein by reference.

FIELD

Embodiments described herein relate generally to a structure evaluation system and a structure evaluation method.

BACKGROUND

It is possible to install a sensor on a surface of a structure such as a bridge and detect elastic waves generated inside of the structure. Furthermore, it is possible to install a plurality of sensors on a surface of a structure and locate a position of a source in which the elastic waves are generated (hereinafter referred to as an "elastic wave source") on the basis of a difference between arrival time points of elastic waves detected by the sensors. Elastic waves are generated inside of the structure even if an external impact has been applied to the surface of the structure. Thus, a position of the elastic wave source can be located.

When there is damage in a propagation path of elastic waves inside of the structure, the propagation of elastic waves is hindered. In this case, the accuracy of a result of locating a position of the elastic wave source is lowered. When a spatially uniform impact such as a collision with a road surface caused by raindrops during rainfall is applied to the surface of a structure and elastic waves are detected by sensors installed facing each other, a density of the elastic wave sources is reduced in a region with internal damage and the reduced density is observed. Damage inside of the structure can be detected using such characteristics.

When a method of applying a uniformly applied impact to the surface of the structure is used, a distribution of the elastic wave source will be uniform if there is no damage inside of the structure. This method is based on the premise that a uniformly applied impact is applied to the surface of the structure. However, it is necessary to use a natural phenomenon such as raindrops or to hit the road surface over a wide range so that a uniform impact is applied to the road surface. Thus, it is necessary to restrict lanes, which may impair the convenience of users. On the other hand, the wheel load of a traveling vehicle can be considered as a means of applying an impact in a limited range without any lane restriction. However, because the elastic wave source generated by the wheel load is particularly concentrated in a rutted portion, a propagation path of elastic waves passing through the inside of the structure is biased and the internal damage may not be evaluated correctly.

DETAILED DESCRIPTION

The present invention provides a problem to be solved by the present invention is to provide a structure evaluation system and a structure evaluation method capable of improving the accuracy of an evaluation of a structure.

According to one embodiment, a structure evaluation system includes an impact imparting unit, a plurality of sensors, a position locator, and an evaluator. The impact imparting unit applies impacts to a second region different from a first region of a structure to which traveling sections of a vehicle, which travels on the structure, apply impacts. The plurality of sensors detect elastic waves generated in the structure. The position locator locates a position of a source of the elastic waves on the basis of the elastic waves detected by each of the plurality of sensors. The evaluator evaluates a deterioration state of the structure on the basis of a position location result of the position locator.

Hereinafter, a structure evaluation system and a structure evaluation method of embodiments will be described with reference to the drawings.

(Overview)

The structure evaluation system according to the embodiment is a system capable of improving the accuracy of an evaluation of the structure as compared with the conventional technology in a method of evaluating damage inside of a structure using a traveling vehicle traveling on a surface of the structure (hereinafter referred to as a "road surface"). First, a conventional evaluation method will be described with reference to FIG. 1.

Figure 1A:
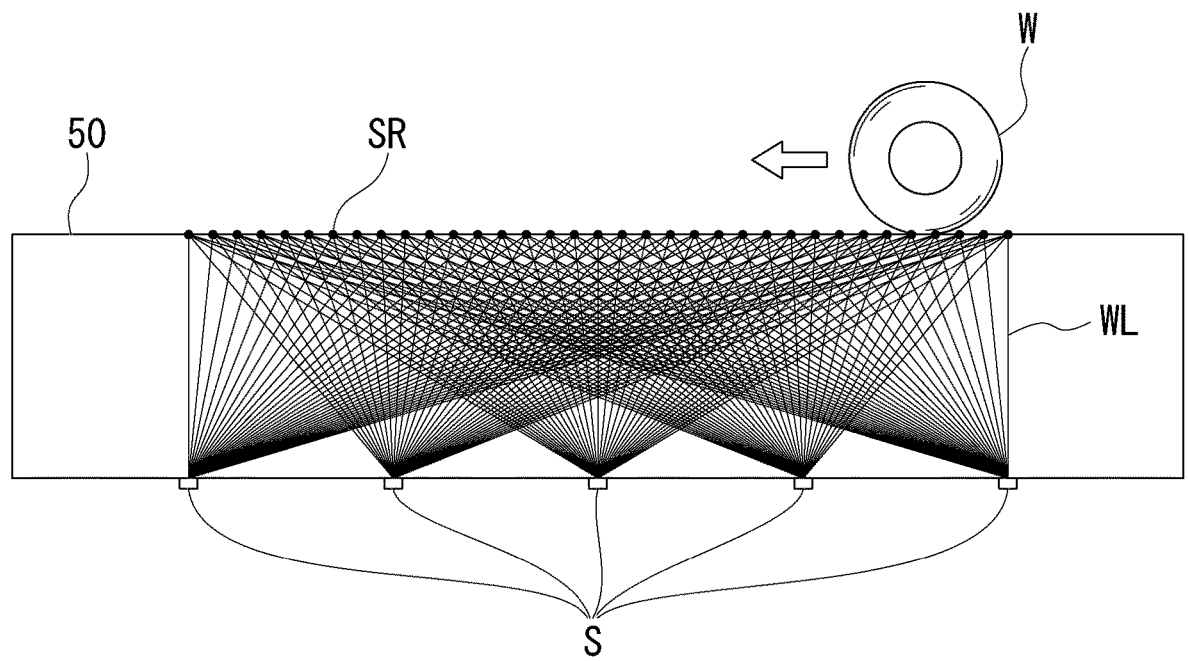
FIG. 1A is a diagram for describing an evaluation method of a conventional structure evaluation system.
Figure 1B:
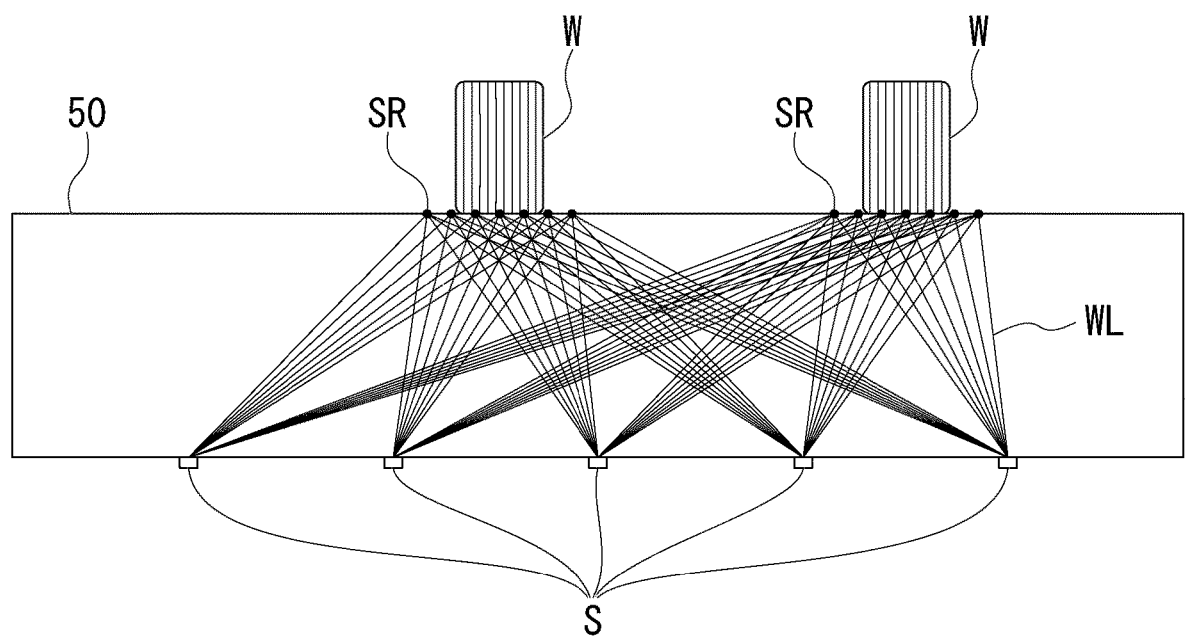
FIG. 1B is a diagram for describing an evaluation method of a conventional structure evaluation system.

FIGS. 1A and 1B area diagram for describing an evaluation method of a conventional structure evaluation system. Under the situation as shown in FIGS. 1A and 1B, a load is applied to the road surface due to contact between traveling sections W (for example, a tire) of the vehicle and the road surface. The load on the road surface is caused by the traveling sections W of the vehicle. In this way, the traveling sections W of the vehicle applies impacts to the road surface. As a result, elastic waves are generated within a structure 50. A place where the traveling sections W of the vehicle comes into contact with the road surface becomes an elastic wave source SR. On the other hand, no impact is applied to a region over which the traveling sections W of the vehicle does not pass among regions of the road surface. A region where the traveling sections W of the vehicle comes into contact with the road surface corresponds to a first region and a region where the traveling sections W of the vehicle does not come into contact with the road surface corresponds to a second region.

When the elastic waves caused by the traveling sections W of the vehicle have been detected by one or more sensors S installed on a lower surface of the structure 50, a density of the elastic wave sources SR is reduced in a region where the inside of the structure 50 is damaged and the reduced density is observed. The damage of the inside of the structure 50 can be detected by utilizing such characteristics. That is, it is possible to evaluate the presence or absence of damage in a passing range of an elastic wave ray WL when the elastic waves generated by the traveling sections W of the vehicle propagate to the one or more sensors S.

In FIG. 1A, a wave ray distribution when the traveling sections W of the vehicle traveling on the road surface and the structure 50 are viewed from the side is shown. In FIG. 1B, a wave ray distribution when the traveling sections W of the vehicle traveling on the road surface and the structure 50 are viewed from the front is shown. Also, an arrow in FIG. 1A indicates a vehicle traveling direction. The wave ray distribution represents a distribution of a plurality of elastic wave rays WL.

Because the traveling sections W of the vehicle travels in the vehicle traveling direction, elastic wave sources SR are continuously present in the vehicle traveling direction. Thus, as shown in FIG. 1A, it can be seen that elastic wave rays WL are evenly distributed over a wide range. On the other hand, as shown in FIG. 1B, in relation to the elastic waves caused by the traveling sections W of the vehicle, the elastic wave sources SR are concentrated at a wheel load position where the traveling sections W of the vehicle travels. Here, the wheel load position is a position where a load is applied by the traveling sections W of the vehicle. Thus, it can be seen that a path of the elastic waves passing through the inside of the structure 50 is biased. As shown in FIG. 1B, it can be seen that the distribution of the elastic wave rays WL becomes sparse and there is a region through which the elastic wave rays WL do not pass. In this case, even if there is damage in the region through which the elastic wave rays WL do not pass, an evaluation process cannot be performed.

Therefore, in the structure evaluation system according to the present embodiment, an elastic wave generation method is devised by providing an impact imparting unit with respect to the vehicle so that impacts are applied to a road surface in a vehicle width direction that is a direction orthogonal to a vehicle traveling direction more densely. The impact imparting unit is a mechanism that applies impacts to the road surface separately from the traveling sections W of the vehicle. As a method of generating elastic waves so that impacts are applied more densely, there are a method of increasing the number of wheels in the vehicle width direction using an impact imparting unit including wheels, a method using an impact imparting unit for performing a water spraying process, a method using an impact imparting unit for applying a hit, and a method using an impact imparting unit for performing a laser irradiation process. One of the merits when such a method is used is that there is no need for the vehicle restriction at the time of inspection. Hereinafter, embodiments using each method will be described.

First Embodiment

In a first embodiment, a configuration using the method of increasing the number of wheels in the vehicle width direction using the impact imparting unit including wheels will be described as a method of generating elastic waves so that impacts are applied more densely.

Figure 2:
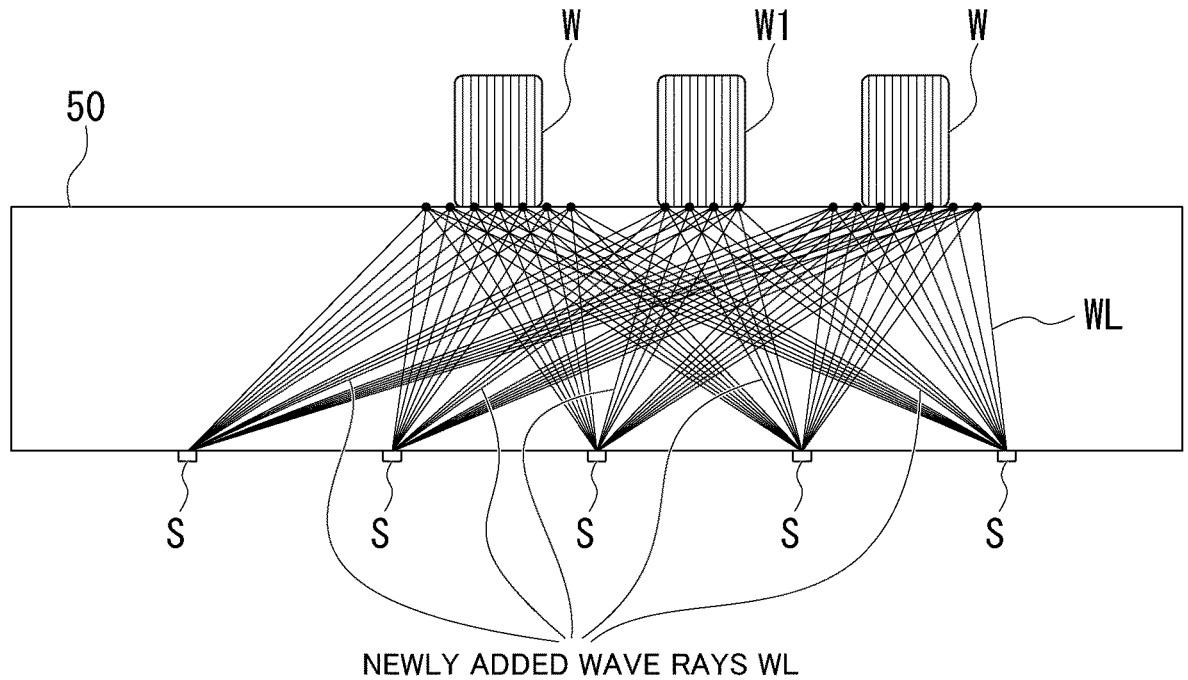
FIG. 2 is a diagram for describing an elastic wave generation method according to a first embodiment.

FIG. 2 is a diagram for describing a method of generating elastic waves in the first embodiment. As shown in FIG. 2, in the first embodiment, impacts are applied to the road surface by increasing the number of wheels W1 so that the traveling sections W of the vehicle and the wheels are not aligned in the vehicle traveling direction. Thereby, the elastic waves caused by the wheels W1 propagate inside of the structure 50 and are detected by the sensor S. Because the elastic waves caused by the wheel W1 propagate along a path different from a propagation path of the elastic waves caused by the traveling sections W of the vehicle, it can be seen that elastic wave rays WL are added to a new path.

Figure 3:
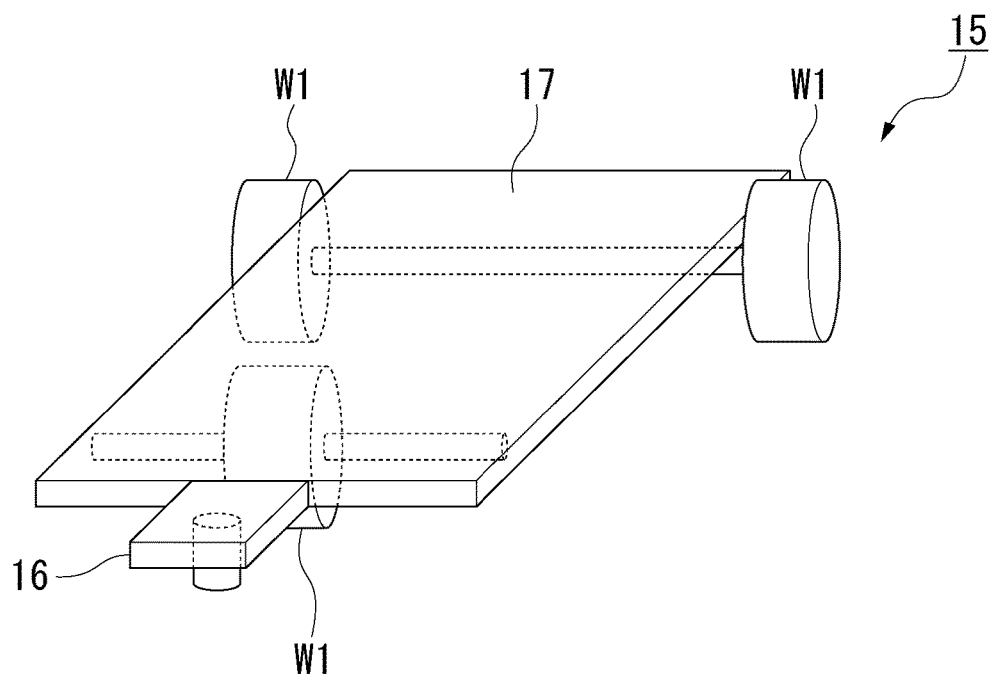
FIG. 3 is a diagram (part 1) showing an example of a towed vehicle used in the first embodiment.

When the wheels are aligned in the vehicle traveling direction, the elastic wave sources are aligned, interference between elastic waves is caused, and the process is complicated. Therefore, as shown in FIG. 2, it is advantageous to shift the wheels in the vehicle traveling direction for the analysis of elastic waves. In relation to the wheel W1 to be newly added, for example, a method using a towed vehicle as shown in FIG. 3 can be mentioned. FIG. 3 is a diagram (part 1) showing an example of the towed vehicle used in the first embodiment. The towed vehicle is an example of the impact imparting unit 15. The towed vehicle shown in FIG. 3 includes a plurality of wheels W1, a towing portion 16, and a loader 17. The towed vehicle is towed by the vehicle. The towed vehicle and the vehicle are connected by the towing portion 16 and the towed vehicle can also travel according to traveling of the vehicle.

The plurality of wheels W1 included in the towed vehicle shown in FIG. 3 are one front wheel and two rear wheels in the vehicle width direction and the wheels W1 are arranged at positions that do not overlap each other in the vehicle traveling direction and further arranged at positions that do not overlap the traveling sections W of the vehicle in the vehicle traveling direction. Although the number of wheels W1 is not limited to the number shown in FIG. 3, there is a possibility that the load applied to each ground plane will decrease when an area of contact with the road surface increases according to an increase in the number of wheels W1. In this case, the wheel load applied to the ground plane is distributed and reduced. If the wheel load is not sufficient to generate elastic waves, it is only necessary to increase the load by loading a weight on the loader 17.

Figure 4:
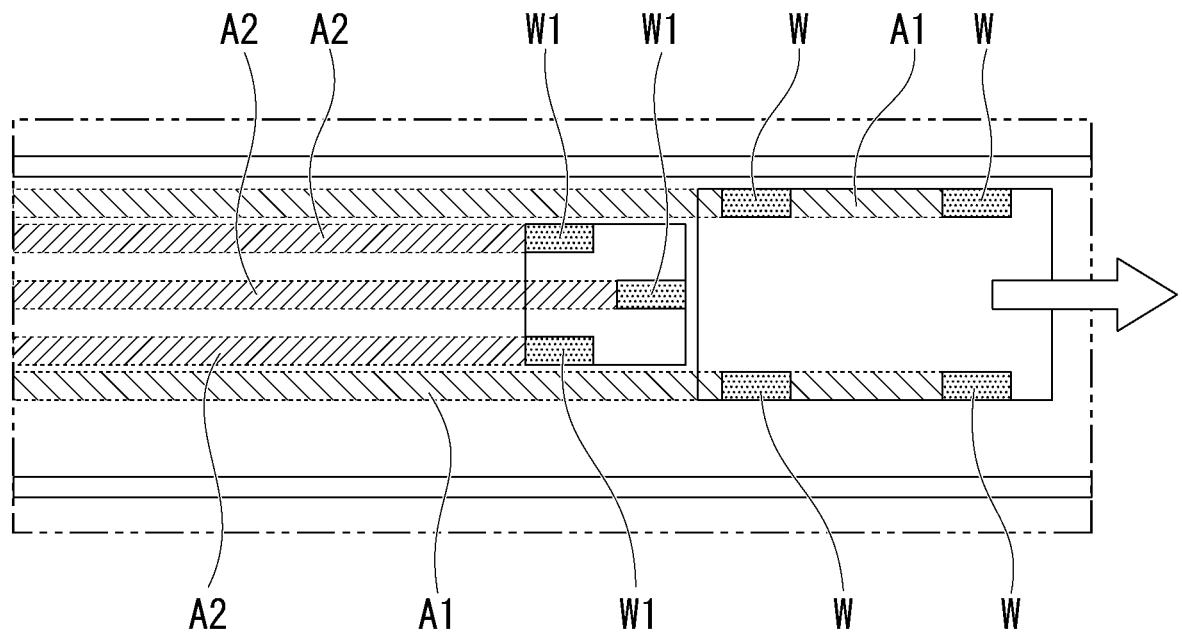
FIG. 4 is a diagram showing a position of an elastic wave source that is added when the towed vehicle shown in FIG. 3 is used.

FIG. 4 is a diagram showing a position of an elastic wave source that is added when the towed vehicle shown in FIG. 3 is used. A region A1 represents a region where a source of elastic waves generated by impacts applied by the traveling sections W of the vehicle is generated. A region A2 represents a region where a source of elastic waves generated by impacts applied by the wheel W1 of the towed vehicle is generated. According to this configuration, it is possible to perform a compensation process for a region where impacts cannot be applied only by the traveling sections W of the conventional vehicle.

Figure 5:
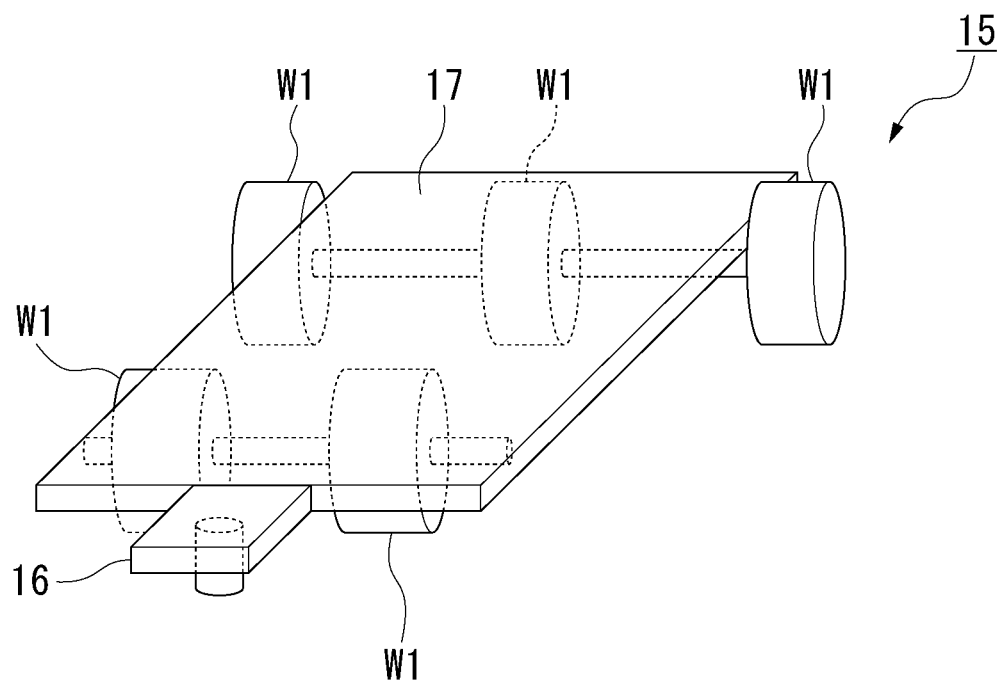
FIG. 5 is a diagram (part 2) showing an example of a towed vehicle used in the first embodiment.

FIG. 5 is a diagram (part 2) showing an example of the towed vehicle used in the first embodiment. As in FIG. 3, the towed vehicle shown in FIG. 5 includes a plurality of wheels W1, a towing portion 16, and a loader 17. The towed vehicle shown in FIG. 5 has a configuration in which the number of wheels W1 is increased with respect to the towed vehicle shown in FIG. 3. Even in this case, the wheels W1 are arranged at positions that do not overlap each other in the vehicle traveling direction and are further arranged at positions that do not overlap the traveling sections W of the vehicle in the vehicle traveling direction.

Figure 6:
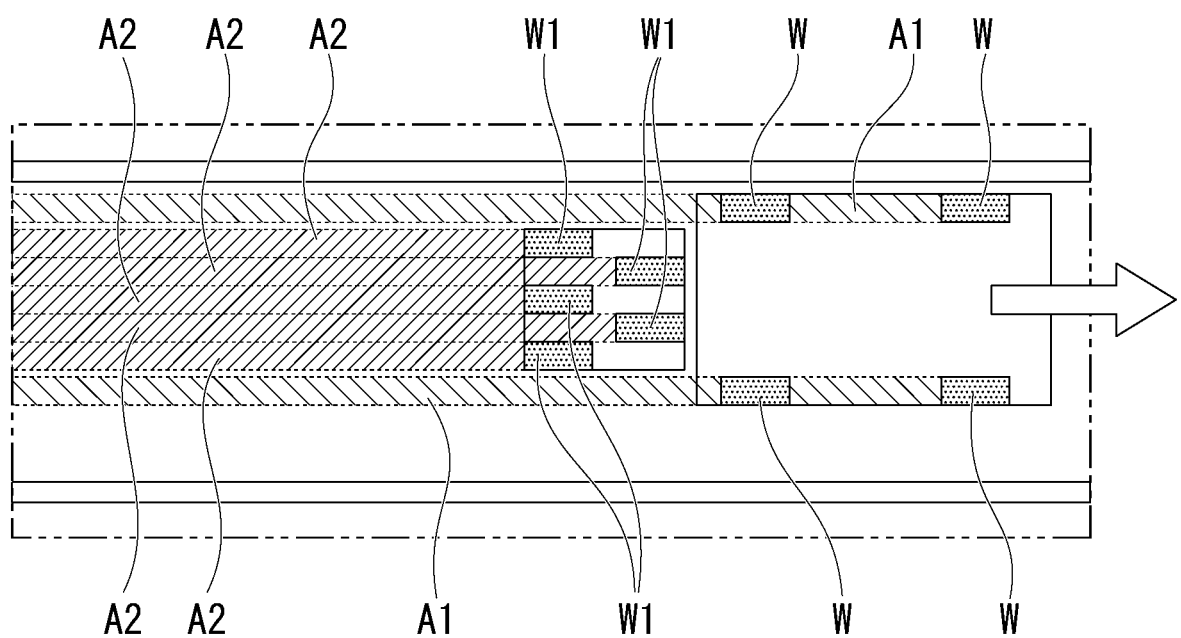
FIG. 6 is a diagram showing a position of an elastic wave source that is added when the towed vehicle shown in FIG. 5 is used.

FIG. 6 is a diagram showing a position of an elastic wave source that is added when the towed vehicle shown in FIG. 5 is used. By adopting the configuration shown in FIG. 6, it is possible to perform a compensation process for the region where the impacts cannot be applied only by the traveling sections W of the conventional vehicle as compared with the configuration shown in FIG. 3.

Next, a configuration in which the deterioration state of the structure is evaluated will be described using the impact imparting unit 15 as the towed vehicle shown in FIG. 3 or FIG. 5.

Figure 7:
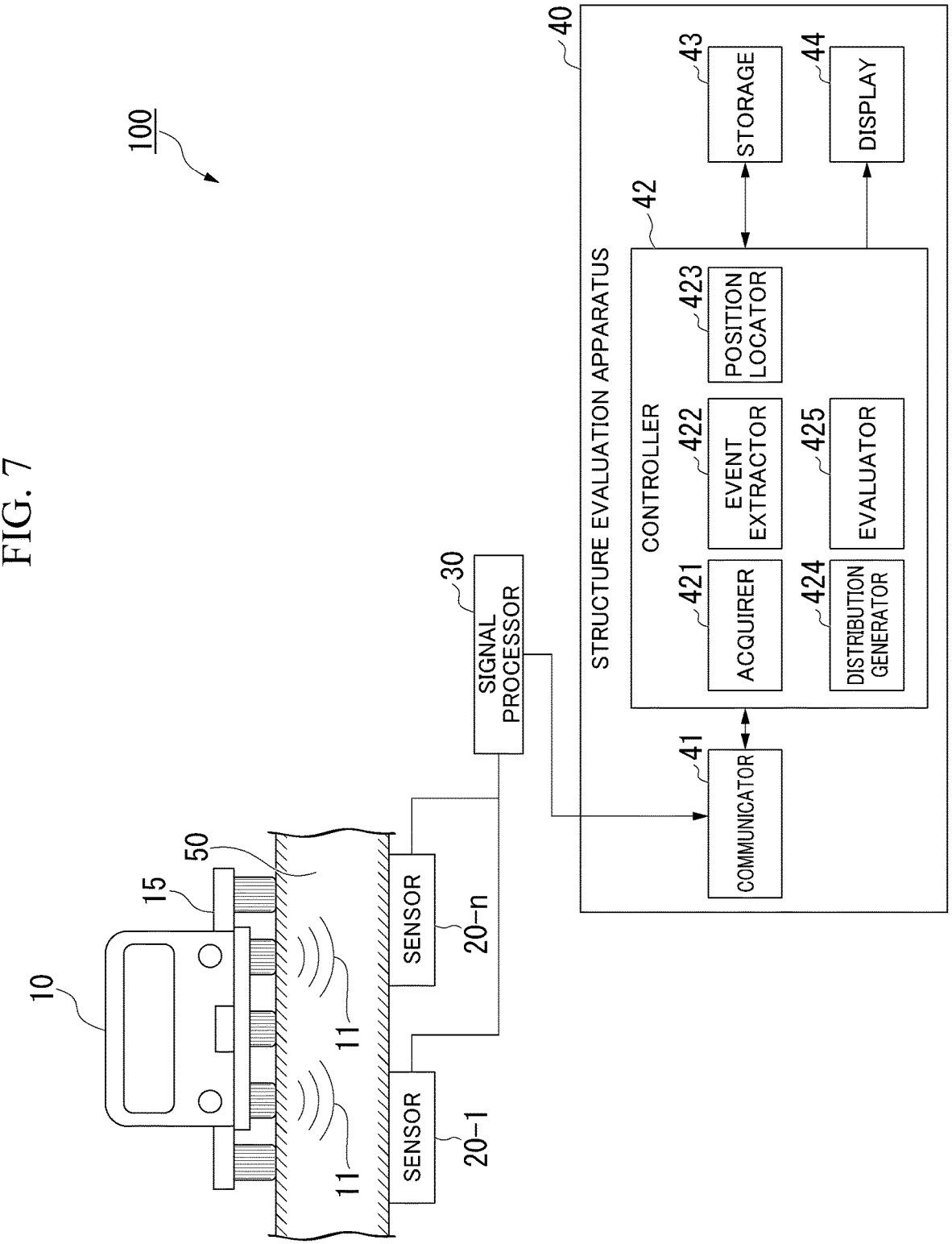
FIG. 7 is a diagram showing a configuration of a structure evaluation system according to the first embodiment.

FIG. 7 is a diagram showing a configuration of a structure evaluation system 100 according to a first embodiment.

The structure evaluation system 100 is used to evaluate the robustness of a structure 50. In the following description, an evaluation process is a process of determining a degree of robustness of the structure 50, i.e., a deterioration state of the structure 50, on the basis of a certain criterion.

Although a bridge made of concrete will be described as an example of the structure 50 in the following description, the structure 50 does not need to be limited to the bridge. The structure 50 may be any structure as long as elastic waves 11 are generated due to the occurrence or growth of cracks or an external impact (for example, rain, artificial rain, or the like). For example, the structure 50 may be bedrock. The bridge is not limited to a structure built over a river or a valley, and includes various structures (for example, a viaduct on an expressway) provided above the ground.

Damage that affects the evaluation of the deterioration state of the structure 50 is, for example, damage inside of the structure that hinders the propagation of elastic waves 11 such as cracks, cavities, and sedimentation. Here, the cracks include vertical cracks, horizontal cracks, oblique cracks, and the like. The vertical cracks are cracks that occur in a vertical direction with respect to a road surface. The horizontal cracks are cracks that occur in a horizontal direction with respect to the road surface. The oblique cracks are cracks that occur in a direction other than the horizontal and vertical directions with respect to the road surface. The sedimentation is deterioration in which concrete changes to a sediment-like form mainly at a boundary between asphalt and a concrete deck.

The structure evaluation system 100 includes an impact imparting unit 15, a plurality of sensors 20-1 to 20-$n$, a signal processor 30, and a structure evaluation apparatus 40. Each of the plurality of sensors 20-1 to 20-$n$ and the signal processor 30 are communicatively connected by cable. The signal processor 30 and the structure evaluation apparatus 40 are communicatively connected by cable or wirelessly. Also, in the following description, when the sensors 20-1 to 20-$n$ are not distinguished, they will be referred to as sensors 20. The sensors 20-1 to 20-$n$ correspond to the sensors S shown in FIGS. 1 and 2.

The impact imparting unit 15 is a towed vehicle towed by the vehicle 10. The impact imparting unit 15 has, for example, the configuration of FIG. 3 or FIG. 5. The impact imparting unit 15 travels in accordance with the traveling of the vehicle 10 and applies impacts to the road surface by contact between the road surface and the wheels W1.

The sensor 20 has a piezoelectric element and detects elastic waves 11 generated from the inside of the structure 50. The sensor 20 is installed at a position on the surface of the structure 50 where the elastic waves 11 can be detected. For example, the sensors 20 are installed on any surface of the road surface, a side surface, and a bottom surface. The sensor 20 converts the detected elastic waves 11 into an electrical signal. In the following description, a case where the sensor 20 is installed on the bottom surface of the structure 50 will be described as an example.

For the sensor 20, for example, a piezoelectric element having sensitivity in a range of 10 kHz to 1 MHz is used. The sensor 20 is of a type such as a resonance type having a resonance peak in a frequency range or a wide band type in which resonance is limited, and the sensor 20 may be of any type. Methods in which the sensor 20 detects the elastic waves 11 include a voltage output type, a resistance change type, an electrostatic capacitance type, and the like, but any detection method may be used.

An acceleration sensor may be used instead of the sensor 20. In this case, the acceleration sensor detects the elastic waves 11 generated inside of the structure 50. The acceleration sensor converts the detected elastic waves 11 into an electrical signal by performing the same process as the sensor 20.

For example, an amplifier and an analog-to-digital (A/D) converter (not shown) are provided between the sensor 20 and the signal processor 30.

The amplifier amplifies the electrical signal output from the sensor 20. The amplifier outputs the amplified electrical signal to the A/D converter. The amplifier amplifies the electrical signal to an extent that the electrical signal can be processed by, for example, the A/D converter.

The A/D converter quantizes the amplified electrical signal and converts the quantized amplified electrical signal into a digital signal. The A/D converter outputs the digital signal to the signal processor 30.

The signal processor 30 inputs a digital signal output from the A/D converter. The signal processor 30 performs signal processing on the input digital signal. The signal processing performed by the signal processor 30 is, for example, noise removal, parameter extraction, and the like. The signal processor 30 generates transmission data including a digital signal after the signal processing. The signal processor 30 outputs the generated transmission data to the structure evaluation apparatus 40.

The signal processor 30 is configured using an analog circuit or a digital circuit. The digital circuit is implemented by, for example, a field-programmable gate array (FPGA) or a microcomputer. The digital circuit may be implemented by a dedicated large-scale integration (LSI) circuit. Also, the signal processor 30 may be equipped with a non-volatile memory such as a flash memory or a removable memory.

Figure 8:
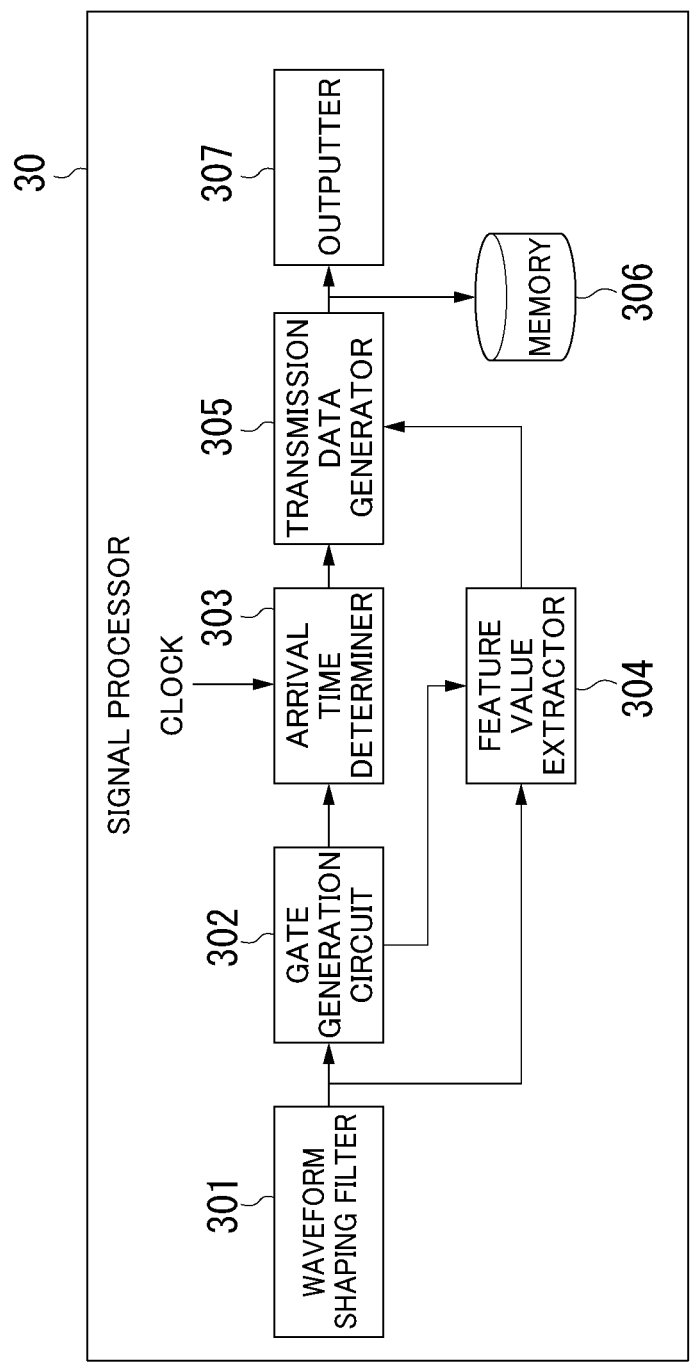
FIG. 8 is a schematic block diagram showing functions of a signal processor according to the first embodiment.

FIG. 8 is a schematic block diagram showing functions of the signal processor 30 according to the first embodiment. The signal processor 30 includes a waveform shaping filter 301, a gate generation circuit 302, an arrival time determiner 303, a feature value extractor 304, a transmission data generator 305, a memory 306, and an outputter 307.

The waveform shaping filter 301 removes noise components outside of a prescribed band from the input digital signal. The waveform shaping filter 301 is, for example, a digital bandpass filter (BPF). The waveform shaping filter 301 outputs a digital signal after noise component removal (hereinafter referred to as a "noise-removed signal") to the gate generation circuit 302 and the feature value extractor 304.

The gate generation circuit 302 receives an input of the noise-removed signal output from the waveform shaping filter 301. The gate generation circuit 302 generates a gate signal on the basis of the input noise-removed signal. The gate signal is a signal indicating whether or not a waveform of the noise-removed signal is sustained.

The gate generation circuit 302 is implemented by, for example, an envelope detector and a comparator. The envelope detector detects the envelope of the noise-removed signal. The envelope is extracted, for example, by squaring the noise-removed signal and performing a prescribed process (for example, a process using a low-pass filter or a Hilbert transform) on a squared output value. The comparator determines whether or not the envelope of the noise-removed signal is greater than or equal to a prescribed threshold value.

When the envelope of the noise-removed signal becomes greater than or equal to the prescribed threshold value, the gate generation circuit 302 outputs a first gate signal indicating that a waveform of the noise-removed signal is sustained to the arrival time determiner 303 and the feature value extractor 304. On the other hand, when the envelope of the noise-removed signal becomes less than the prescribed threshold value, the gate generation circuit 302 outputs a second gate signal indicating that the waveform of the noise-removed signal is not sustained to the arrival time determiner 303 and the feature value extractor 304.

The arrival time determiner 303 receives inputs of a clock output from a clock source such as a crystal oscillator (not shown) and a gate signal output from the gate generation circuit 302. The arrival time determiner 303 determines an arrival time point of the elastic waves using the clock input while the first gate signal is input. The arrival time determiner 303 outputs the determined arrival time point of the elastic waves as time point information to the transmission data generator 305. The arrival time determiner 303 does not perform a process while the second gate signal is being input. The arrival time determiner 303 generates cumulative time point information from the time when a power supply is turned on, on the basis of the signal from the clock source. Specifically, the arrival time determiner 303 may be a counter that counts the edges of the clock and a value of the register of the counter may be used as the time point information. The register of the counter is determined to have a prescribed bit length.

The feature value extractor 304 receives inputs of the noise-removed signal output from the waveform shaping filter 301 and the gate signal output from the gate generation circuit 302. The feature value extractor 304 extracts a feature value of the noise-removed signal using the noise-removed signal input while the first gate signal is input. The feature value extractor 304 does not perform a process while the second gate signal is input. The feature value is information indicating the feature of the noise-removed signal.

Feature quantities include, for example, an amplitude [mV] of the waveform, a rising time [μsec] of the waveform, the duration [μsec] of the gate signal, a zero-crossing count number [times], and the energy [arb.] of the waveform, a frequency [Hz], a root mean square (RMS) value, and the like. The feature value extractor 304 outputs a parameter related to the extracted feature value to the transmission data generator 305. When the parameter related to the feature value is output, the feature value extractor 304 associates a sensor ID with the parameter related to the feature value. The sensor ID represents identification information for identifying the sensor 20 installed in a region (hereinafter referred to as an "evaluation region") serving as an evaluation target for the robustness of the structure 50.

The amplitude of the waveform is, for example, a value of the maximum amplitude in the noise-removed signal. A rising time period of the waveform is, for example, a time period T1 from the start of the rising of the gate signal to the time when the noise-removed signal reaches the maximum value. The duration of the gate signal is, for example, a time period from the start of the rising of the gate signal to the time when the amplitude becomes smaller than a preset value. The zero-crossing count number is, for example, the number of times the noise-removed signal crosses a reference line passing through the zero value.

The energy of the waveform is, for example, a value obtained by time-integrating the square of the amplitude of the noise-removed signal at each time point. The definition of energy is not limited to the above example and the energy may be approximated using, for example, the envelope of the waveform. The frequency is a frequency of the noise-removed signal. The RMS value is, for example, a value obtained by squaring the amplitude of the noise-removed signal and finding the square root of the squared amplitude at each time point.

The transmission data generator 305 receives inputs of a sensor ID, time point information, and a parameter related to a feature value. The transmission data generator 305 generates transmission data including the input sensor ID, the input time point information, and the input parameter related to the feature value.

The memory 306 stores the transmission data. The memory 306 is, for example, a dual-port random access memory (RAM).

The outputter 307 sequentially outputs the transmission data stored in the memory 306 to the structure evaluation apparatus 40.

Description will be continuously given by returning to FIG. 7.

The structure evaluation apparatus 40 includes a communicator 41, a controller 42, a storage 43, and a display 44.

The communicator 41 receives the transmission data output from the signal processor 30.

The controller 42 controls the entire structure evaluation apparatus 40. The controller 42 is configured using a processor such as a central processing unit (CPU) and a memory. By executing the program, the controller 42 functions as an acquirer 421, an event extractor 422, a position locator 423, a distribution generator 424, and an evaluator 425.

Some or all of the functional units of the acquirer 421, the event extractor 422, the position locator 423, the distribution generator 424, and the evaluator 425 may be implemented by hardware such as an application-specific integrated circuit (ASIC), a programmable logic device (PLD), or an FPGA or may be implemented by software and hardware in cooperation. The program may be recorded on a computer-readable recording medium. The computer-readable recording medium is, for example, a non-transitory storage medium such as a flexible disk, a magneto-optical disk, a ROM, a portable medium such as a CD-ROM, or a storage device such as a hard disk built in a computer system. The program may be transmitted via a telecommunication circuit.

Some of the functions of the acquirer 421, the event extractor 422, the position locator 423, the distribution generator 424, and the evaluator 425 do not need to be mounted in the structure evaluation apparatus 40 in advance and may be implemented by installing an additional application program in the structure evaluation apparatus 40.

The acquirer 421 acquires various types of information. For example, the acquirer 421 acquires the transmission data received by the communicator 41. The acquirer 421 stores the acquired transmission data in the storage 43.

The event extractor 422 extracts the transmission data in one event from the transmission data stored in the storage 43. The event is an elastic wave generation event that has occurred in the structure 50. The elastic wave generation event according to the present embodiment is an event in which the vehicle 10 and the towed vehicle pass over the road surface. When one event has occurred, the elastic waves 11 are detected by the plurality of sensors 20 at substantially the same time point. That is, the storage 43 stores the transmission data related to the elastic waves 11 detected at substantially the same time point. Therefore, the event extractor 422 provides a prescribed time window and extracts all transmission data whose arrival time point is within a range of the time window as transmission data in one event. The event extractor 422 outputs the transmission data in one extracted event to the position locator 423.

A range Tw of a time window may be determined so that the range Tw is in the range of Tw≥dmax/v using an elastic wave propagation velocity v in the target structure 50 and a maximum sensor interval dmax. Because it is desirable to set Tw to a value as small as possible so that erroneous detection is avoided, Tw=dmax/v can be substantially set. The elastic wave propagation velocity v may be obtained in advance.

The position locator 423 performs a position location process on an elastic wave source on the basis of sensor position information and a sensor ID and time point information included in each of a plurality of pieces of transmission data extracted by the event extractor 422.

The sensor position information includes information about an installation position of the sensor 20 in association with the sensor ID. The sensor position information includes information about an installation position of the sensor 20, such as latitude and longitude, or distances from a reference position of the structure 50 in the horizontal and vertical directions. The position locator 423 retains the sensor position information in advance. The sensor position information may be stored in the position locator 423 at any timing before the position locator 423 performs the position location process on the elastic wave source.

The sensor position information may be stored in the storage 43. In this case, the position locator 423 acquires the sensor position information from the storage 43 at the timing when the position location process is performed. A Kalman filter, a least-squares method, or the like may be used to locate the position of the elastic wave source. The position locator 423 outputs the position information of the elastic wave source obtained for a measurement period to the distribution generator 424.

The distribution generator 424 receives inputs of position information of a plurality of elastic wave sources output from the position locator 423. The distribution generator 424 generates an elastic wave source distribution using the input position information of the plurality of elastic wave sources.

The elastic wave source distribution represents a distribution in which positions of the elastic wave sources are shown. More specifically, the elastic wave source distribution is a distribution in which points representing positions of elastic wave sources are shown on ideal data representing the structure 50 serving as the evaluation target when the horizontal axis represents a distance in a passing direction and the vertical axis represents a distance in a width direction. The distribution generator 424 generates an elastic wave source density distribution using the elastic wave source distribution. For example, the distribution generator 424 generates the elastic wave source density distribution by representing the position of the elastic wave source in a contour diagram.

The evaluator 425 evaluates a deterioration state of the structure 50 on the basis of the elastic wave source density distribution generated by the distribution generator 424. For example, the evaluator 425 evaluates a region where the density of the elastic wave sources in the elastic wave source density distribution is greater than or equal to a threshold value as a robust region and evaluates a region where the density of the elastic wave sources is less than the threshold value as a damaged region. A region through which an elastic wave ray indicating the propagation path of the elastic waves between the elastic wave source and each sensor 20 passes is the evaluation region. Therefore, the evaluator 425 evaluates the deterioration state of the structure within the evaluation region.

The storage 43 stores the transmission data acquired by the acquirer 421. The storage 43 is configured using a storage device such as a magnetic hard disk device or a semiconductor storage device.

The display 44 displays an evaluation result in accordance with the control of the evaluator 425. Further, the display 44 displays a group of elastic wave rays WL indicating the propagation path of the elastic waves between the elastic wave source and each sensor 20 in, for example, a projection method, in accordance with the control of the evaluator 425. The display 44 is an image display device such as a liquid crystal display or an organic electro-luminescence (EL) display. The display 44 may be an interface for connecting the image display device to the structure evaluation apparatus 40. In this case, the display 44 generates a video signal for displaying the evaluation result and outputs the video signal to an image display device connected to the display 44.

Figure 9:
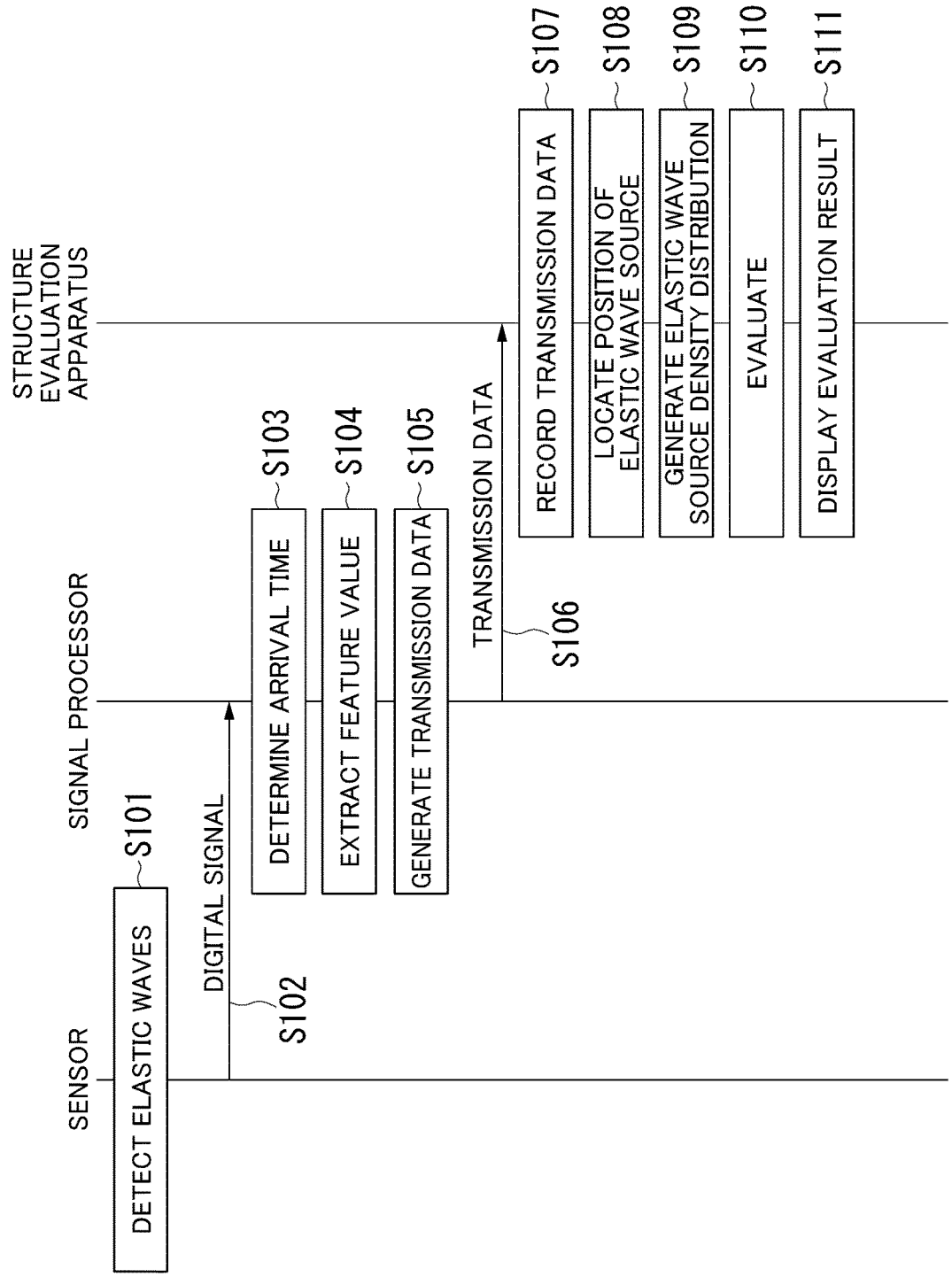
FIG. 9 is a sequence diagram showing a flow of a deterioration state evaluation process of the structure evaluation system according to the first embodiment.

FIG. 9 is a sequence diagram showing a flow of a deterioration state evaluation process of the structure evaluation system 100 according to the first embodiment. The process of FIG. 9 is executed according to the vehicle 10 traveling on the structure 50 serving as the evaluation target.

When the vehicle 10 travels on the structure 50 serving as the evaluation target, the traveling sections W of the vehicle 10 and the wheel W1 of the towed vehicle come into contact with the road surface. Thereby, elastic waves 11 are generated within the structure 50. Each of the plurality of sensors 20 detects the elastic waves 11 generated within the structure 50 (step S101). Each of the plurality of sensors 20 converts the detected elastic waves 11 into an electrical signal and outputs the electrical signal to the signal processor 30 (step S102). The electrical signal output from each of the plurality of sensors 20 is amplified by an amplifier (not shown). The amplified electrical signal is converted into a digital signal by an A/D converter.

The signal processor 30 inputs the digital signal output from the A/D converter. The arrival time determiner 303 of the signal processor 30 determines the arrival time point of the elastic waves 11 (step S103). Specifically, the arrival time determiner 303 determines the elastic-wave arrival time point using the clock input while a first gate signal is input. The arrival time determiner 303 outputs the determined elastic-wave arrival time point as time point information to the transmission data generator 305. The arrival time determiner 303 performs this process on all input digital signals.

The feature value extractor 304 of the signal processor 30 extracts a feature value of the noise-removed signal using the noise-removed signal which is a digital signal input while the first gate signal is input (step S104). The feature value extractor 304 outputs a parameter related to the extracted feature value to the transmission data generator 305. The transmission data generator 305 generates transmission data including a sensor ID, time point information, and the parameter related to the feature value (step S105). The outputter 307 sequentially outputs the transmission data to the structure evaluation apparatus 40 (step S106).

The communicator 41 of the structure evaluation apparatus 40 receives the transmission data output from the signal processor 30. The acquirer 421 acquires the transmission data received by the communicator 41. The acquirer 421 records the acquired transmission data in the storage 43 (step S107). The event extractor 422 extracts the transmission data in one event from the transmission data stored in the storage 43. The event extractor 422 outputs the transmission data in one extracted event to the position locator 423 and the distribution generator 424.

The position locator 423 locates a position of the elastic wave source on the basis of the sensor ID and the time point information included in the transmission data output from the event extractor 422 and the sensor position information retained in advance (step S108). Specifically, the position locator 423 first calculates differences between arrival time points of the elastic waves 11 for the plurality of sensors 20. Next, the position locator 423 locates a position of the elastic wave source using the sensor position information and information of the differences between the arrival time points.

The position locator 423 executes the processing of step S108 every time the transmission data of one event is output from the event extractor 422 for a measurement period. Thereby, the position locator 423 locates positions of the plurality of elastic wave sources. The position locator 423 outputs position information of the plurality of elastic wave sources to the distribution generator 424.

The distribution generator 424 generates an elastic wave source distribution using the position information of the plurality of elastic wave sources output from the position locator 423. Specifically, the distribution generator 424 generates the elastic wave source distribution by plotting the positions of the elastic wave sources indicated in the obtained position information of the plurality of elastic wave sources on virtual data. The distribution generator 424 generates an elastic wave source density distribution by representing the generated elastic wave source distribution in a contour diagram (step S109). The distribution generator 424 outputs the generated elastic wave source density distribution to the evaluator 425.

The evaluator 425 evaluates the deterioration state of the structure 50 using the elastic wave source density distribution output from the distribution generator 424 (step S110). The evaluator 425 outputs an evaluation result to the display 44. The display 44 displays the evaluation result output from the evaluator 425 (step S112). For example, the display 44 may display a corrected elastic wave source density distribution as an evaluation result or may display a region regarded to be a damaged region in a display mode different from those of other regions. Further, the evaluator 425 may cause the display 44 to display a group of elastic wave rays WL indicating a propagation path of elastic waves from the elastic wave source to each sensor 20 according to a projection method on the basis of the elastic wave source whose position is located by the position locator 423 and installation position information of each sensor 20. Thereby, it is possible to display, for example, the group of the elastic wave rays WL shown in FIG. 2. Also, the evaluator 425 may cause the group of the elastic wave rays WL to be displayed three-dimensionally.

In the structure evaluation system 100 configured as described above, it is possible to improve the accuracy of an evaluation of the structure. Specifically, in the structure evaluation system 100, the impact imparting unit 15 applies impacts to the region of the road surface where the impacts cannot be applied by the traveling sections W of the vehicle 10. For example, in the structure evaluation system 100 according to the first embodiment, impacts are applied by the wheels W1 of the towed vehicle arranged at positions that do not overlap the traveling sections W of the vehicle 10 in the vehicle width direction. Thereby, the impacts can be applied to the region of the road surface where the impacts cannot be applied by the traveling sections W of the vehicle 10. Therefore, because the elastic wave rays WL can pass through a region where it is difficult for the elastic wave rays WL to pass when impacts has been applied by the traveling sections W of the vehicle 10, it is possible to evaluate the deterioration state even in a region where it is difficult to evaluate the deterioration state. Thus, it is possible to improve the accuracy of an evaluation of the structure.

In Patent Document 2, an elastic wave generation device is provided on the front wheel side and a reception device is provided on the rear wheel side to inspect the soundness of concrete. In Patent Document 2, it is only necessary for the reception device to receive elastic waves by generating the elastic waves. Thus, a configuration in which impacts are applied to a second region different from a first region of a structure to which the traveling sections W of the vehicle 10 that travels on the structure 50 apply the impacts in consideration of a propagation path of elastic waves as in the above-described embodiment is not adopted. Thus, in Patent Document 2, there is a case where the propagation path of the elastic waves passing through the inside of the structure is biased and the internal damage may not be evaluated correctly as described in Description of Related Art. On the other hand, in the above-described embodiment, because the elastic wave rays WL can pass through a region where it is difficult for the elastic wave rays WL to pass when impacts are applied by the traveling sections W of the vehicle 10, it is possible to evaluate the deterioration state even with respect to a region where it is difficult to evaluate the deterioration state. Thus, it is possible to improve the accuracy of an evaluation of the structure.

In Patent Document 3, a vehicle is allowed to travel for the purpose of reducing friction on a pavement surface. In Patent Document 3, a tire arranged in the vehicle width direction is towed and allowed to travel so that impacts are applied to the road surface. However, in this case, there is a problem that the elastic wave sources are aligned, interference between elastic waves is caused, and the process is complicated. On the other hand, in the above-described embodiment, the wheels W1 provided in the impact imparting unit 15 are arranged to be shifted in the vehicle traveling direction. Thereby, it is difficult for interference between elastic waves to occur and it is possible to easily analyze elastic waves.

A modified example in the first embodiment will be described.

In the above-described embodiment, a configuration in which the wheels W1 of the towed vehicle serving as the impact imparting unit 15 are arranged at positions (of treads) between the traveling sections W of the vehicle 10 has been described. The wheels W1 of the towed vehicle serving as the impact imparting unit 15 may be configured to be arranged outside of the traveling sections W of the vehicle 10. An evaluation target region in the structure evaluation system 100 is within a range configured by arranging a plurality of sensors 20. Thus, as long as the wheels W1 of the towed vehicle are within the evaluation target region in the structure evaluation system 100, even if the wheels W1 of the towed vehicle are arranged outside of the traveling sections W of the vehicle 10, the evaluation is not affected.

Second Embodiment

In a second embodiment, a configuration in which an impact imparting unit for performing a water spraying process is used as an elastic wave generation method so that impacts are applied more densely will be described. Also, in the second embodiment, the system configuration itself of the structure evaluation system 100 is similar to that of the first embodiment. A difference between the second embodiment and the first embodiment is the configuration of the impact imparting unit. Hereinafter, the difference from the first embodiment will be mainly described.

Figure 10:
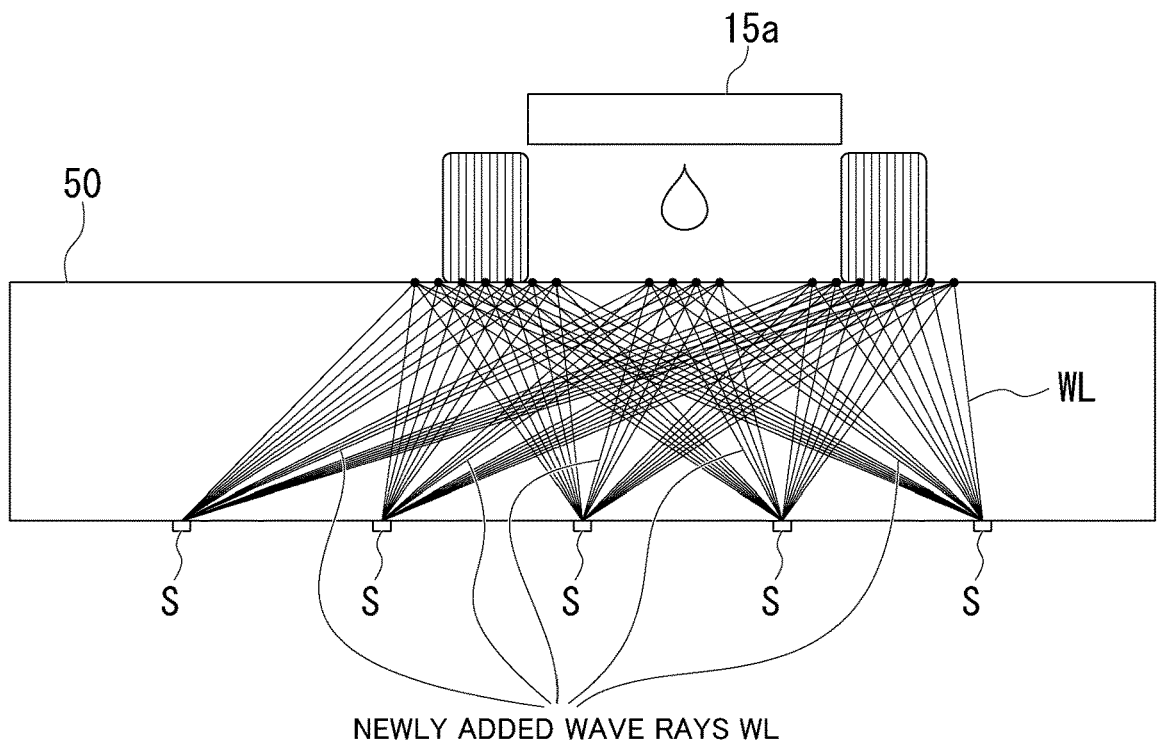
FIG. 10 is a diagram for describing an elastic wave generation method according to a second embodiment.

FIG. 10 is a diagram for describing the elastic wave generation method according to the second embodiment. As shown in FIG. 10, in the second embodiment, an impact imparting unit 15a applies impacts to the road surface by performing a water spraying process with a water spraying device such as a water spraying vehicle or a sprinkler. The water spraying vehicle is a vehicle that can travel on a road surface while spraying water. For example, the water spraying vehicle is a vehicle attached to the rear of the vehicle 10. The water spraying process of the water spraying vehicle is controlled so that the water spraying process of the water spraying device is performed in a region of the road surface where the wheels W1 of the vehicle 10 cannot apply impacts. The water spraying process of the water spraying device may be controlled by a control device provided in the water spraying device. A water spraying location, a water spraying timing, and the like are controlled in the water spraying process of the water spraying device. The water spraying device applies impacts to the road surface by, for example, intermittently performing the water spraying process or meandering along the trajectory of the water spraying process. In this case, the impacts applied to the road surface is water droplets.

According to this configuration, elastic waves caused by impacts of water droplets colliding with the road surface propagate inside of the structure 50 and are detected by the sensor S. Because elastic waves caused by impacts of water droplets colliding with the road surface in the water spraying process propagate along a path different from an elastic wave propagation path caused by the traveling sections W of the vehicle, it can be seen that elastic wave rays WL are added to the new path.

Figure 11:
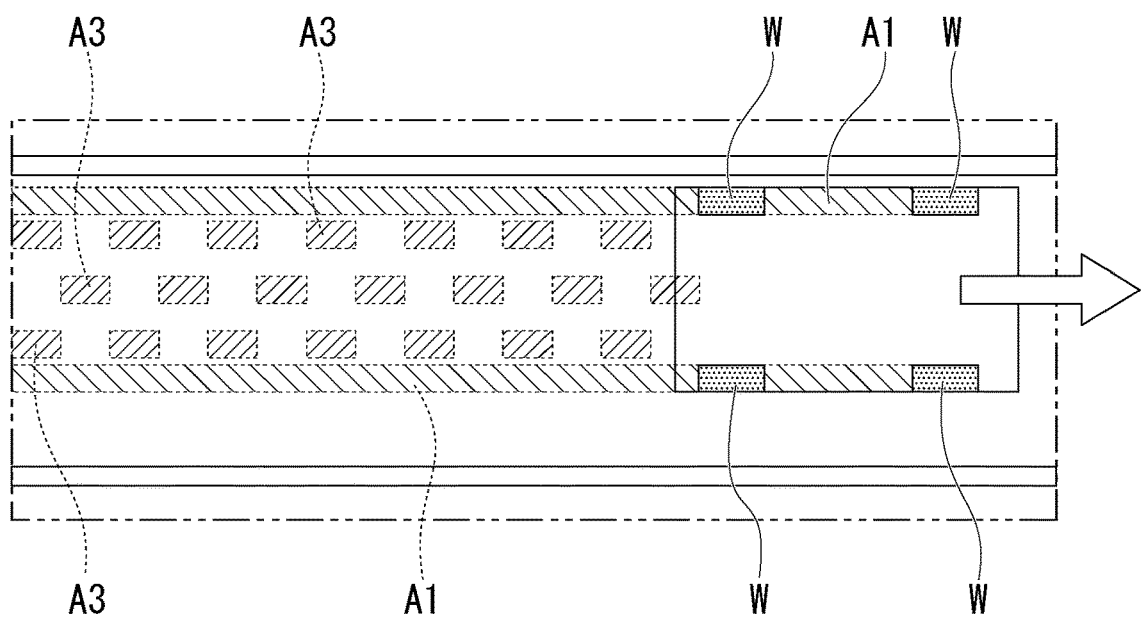
FIG. 11 is a diagram showing a position of an elastic wave source that is added when a water spraying process of a water spraying device is performed intermittently.

FIG. 11 is a diagram showing a position of an elastic wave source that is added when the water spraying process of the water spraying device is performed intermittently. A region A1 represents a region where a source of elastic waves generated by impacts applied by the traveling sections W of the vehicle is generated. A region A3 represents a region where a source of elastic waves generated by impacts applied in the water spraying process of the water spraying device is generated. According to this configuration, it is possible to perform a compensation process for a region where impacts cannot be applied only by the traveling sections W of the conventional vehicle.

In particular, by intermittently performing the water spraying process, it is possible to prevent interference between elastic waves and apply impacts suitable for analysis of elastic waves, as in the first embodiment. In the example shown in FIG. 11, a configuration in which three water spraying locations are provided between the traveling sections W and the water spraying timing is shifted at the center and both ends is shown. When the water spraying location is fixed in this way, the elastic wave source position can be determined relative to the vehicle traveling position. Therefore, it becomes easy to verify the position location result of the elastic waves. Also, three water spraying locations may be provided between the traveling sections W and the water spraying timing may be shifted at each location.

Figure 12:
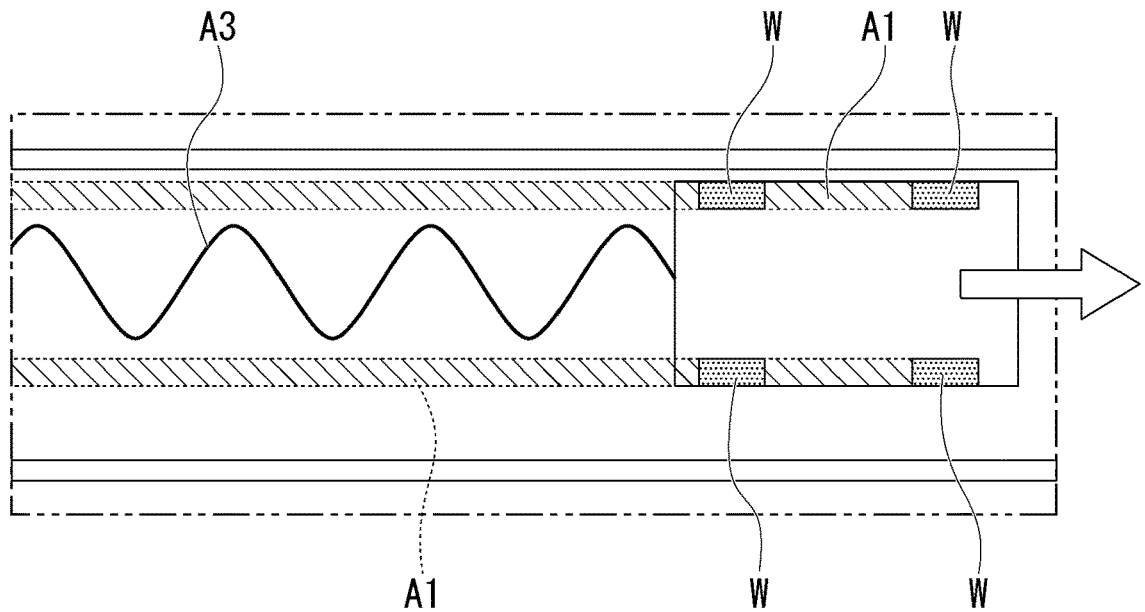
FIG. 12 is a diagram showing a position of an elastic wave source that is added when the water spraying process of the water spraying device is performed continuously.

FIG. 12 is a diagram showing a position of an elastic wave source that is added when the water spraying process of the water spraying device is performed continuously. A region A1 represents a region where a source of elastic waves generated by impacts applied by the traveling sections W of the vehicle is generated. A region A3 represents a region where a source of elastic waves generated by impacts applied in the water spraying process of the water spraying device is generated. In the example shown in FIG. 12, the water spraying device meanders along a trajectory of the water spraying process. In this case, an elastic wave source can be generated in a wide range from a single water spraying location. According to this configuration, it is possible to perform a compensation process for a region where impacts cannot be applied only by the traveling sections W of the conventional vehicle.

Figure 13:
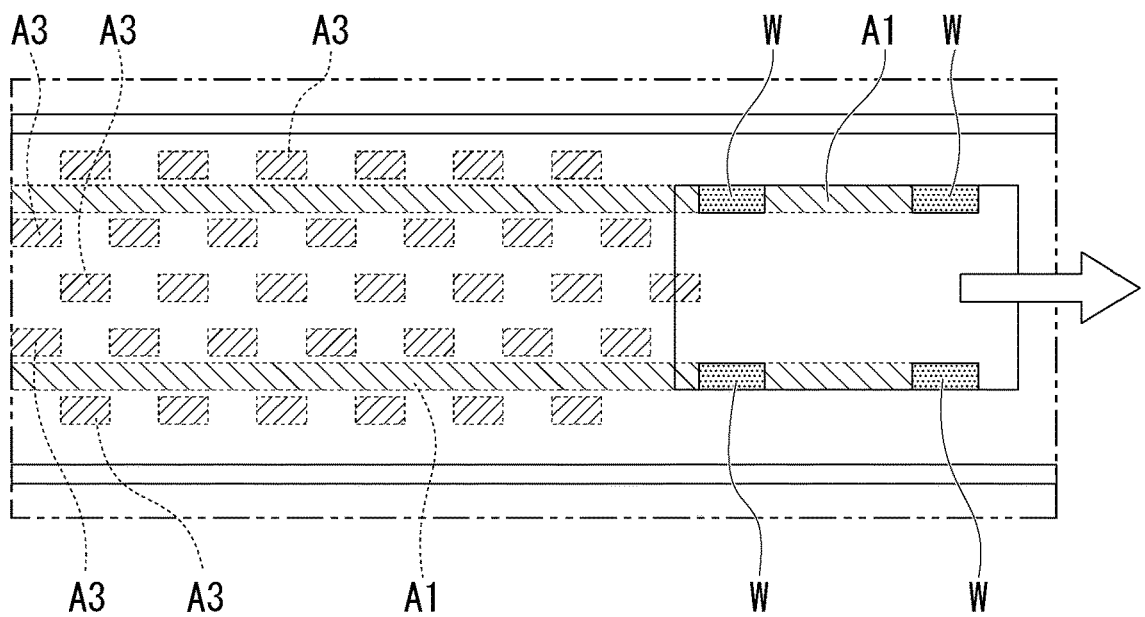
FIG. 13 is a diagram showing a position of an elastic wave source that is added when the water spraying process of the water spraying device is performed intermittently in a state in which a region outside of a tread is included.
Figure 14:
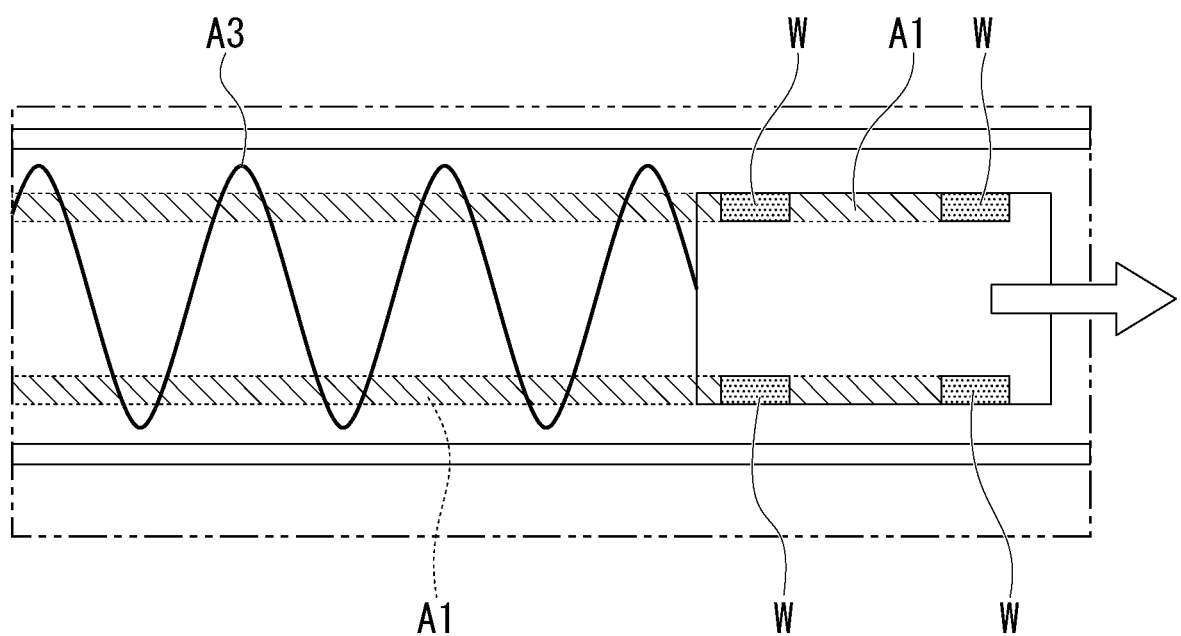
FIG. 14 is a diagram showing a position of an elastic wave source that is added when the water spraying process of the water spraying device is performed continuously in a state in which a region outside of a tread is included.

Although it is assumed that the water spraying process is performed inside of the tread of the vehicle 10 in the configurations shown in FIGS. 11 and 12, a water spraying range may be extended in a state in which a region outside of a tread is included. FIG. 13 is a diagram showing a position of an elastic wave source that is added when the water spraying process of the water spraying device is performed intermittently in a state in which a region outside of a tread is included. FIG. 14 is a diagram showing a position of an elastic wave source that is added when the water spraying process of the water spraying device is performed continuously in a state in which a region outside of a tread is included.

By performing the water spraying process as shown in FIGS. 13 and 14, the water spraying range can be extended and an evaluable region can be extended.

According to the structure evaluation system 100 in the second embodiment configured as described above, it is possible to improve the accuracy of an evaluation of the structure as in the first embodiment. Specifically, in the structure evaluation system 100 according to the second embodiment, impacts are applied in the water spraying process of the water spraying device with respect to a region of the road surface where it is difficult to apply the impacts with the traveling sections W of the vehicle 10. Therefore, because elastic wave rays WL can pass through a region where it is difficult for the elastic wave rays WL to pass when impacts are applied by the traveling sections W of the vehicle 10, it is possible to evaluate the deterioration state even with respect to a region where it is difficult to evaluate the deterioration state. Thus, it is possible to improve the accuracy of an evaluation of the structure.

Third Embodiment

In a third embodiment, a configuration using an impact imparting unit that applies a hit as an elastic wave generation method so that impacts are applied more densely will be described. Also, in the third embodiment, the system configuration itself of the structure evaluation system 100 is similar to that of the first embodiment. A difference between the third embodiment and the first embodiment is the configuration of the impact imparting unit. Hereinafter, the differences from the first embodiment will be mainly described.

In the second embodiment, an impact imparting unit 15b applies impacts to the road surface with a hitting mechanism by allowing a vehicle including the hitting mechanism to travel. For example, the vehicle including the hitting mechanism is a vehicle attached to the rear of the vehicle 10. The hitting mechanism is, for example, a tooth-shaped rotating mechanism. One or more hitting mechanisms are provided in the vehicle including the hitting mechanisms. When the vehicle 10 travels, the tooth-shaped rotating mechanism comes into contact with the road surface at regular intervals, so that the tooth-shaped rotating mechanism applies impacts to the road surface. Like the wheel W1 of the towed vehicle of the first embodiment, the hitting mechanism is arranged so that its position does not overlap the traveling sections W of the vehicle 10 in the vehicle width direction.

Also, the hitting mechanism is not limited to the tooth-shaped rotating mechanism and may be any mechanism as long as impacts can be applied to the road surface. For example, the hitting mechanism may be a mechanism for hitting a hitting tool such as a hammer or a mallet on the road surface at a timing controlled by a control device.

According to the structure evaluation system 100 in the third embodiment configured as described above, it is possible to improve the accuracy of an evaluation of the structure as in the first embodiment. Specifically, in the structure evaluation system 100 according to the third embodiment, the impacts are applied by the hitting mechanism towed by the vehicle 10 with respect to the region of the road surface where it is difficult to apply the impacts with the traveling sections W of the vehicle 10. Therefore, because elastic wave rays WL can pass through a region where it is difficult for the elastic wave rays WL to pass when impacts are applied by the traveling sections W of the vehicle 10, it is possible to evaluate the deterioration state even with respect to a region where it is difficult to evaluate the deterioration state. Thus, it is possible to improve the accuracy of an evaluation of the structure.

A modified example in the third embodiment will be described.

In the above-described embodiment, the hitting mechanism serving as the impact imparting unit 15b is arranged between the traveling sections W (treads) of the vehicle 10. The hitting mechanism serving as the impact imparting unit 15b may be configured to be arranged outside of the traveling sections W of the vehicle 10.

Fourth Embodiment

In a fourth embodiment, a configuration using an impact imparting unit that performs a laser irradiation process as an elastic wave generation method so that impacts are applied more densely will be described. Also, in the fourth embodiment, the system configuration itself of the structure evaluation system 100 is similar to that of the first embodiment. A difference between the fourth embodiment and the first embodiment is the configuration of the impact imparting unit. Hereinafter, the differences from the first embodiment will be mainly described.

In the fourth embodiment, an irradiation device for performing a laser irradiation process is provided as an impact imparting unit 15c on at least one of the vehicle 10 or the vehicle towed by the vehicle 10 and impacts are applied when the road surface is irradiated with a laser by the irradiation device when the vehicle 10 is allowed to travel. The irradiation device heats the road surface by irradiating the road surface with the laser. When the laser is applied to the road surface and heated, impacts are applied to the road surface. One or more irradiation devices are provided in at least one of the vehicle 10 and the vehicle towed by the vehicle 10. The irradiation device performs a laser irradiation process at a timing controlled by the control device. Also, the laser irradiation process of the irradiation device may be performed intermittently or continuously so that a trajectory of the laser meanders. When a plurality of irradiation devices are provided, the irradiation device does not overlap the position of the traveling sections W of the vehicle 10 in the vehicle width direction, as in the wheel W1 of the towed vehicle of the first embodiment.

According to the structure evaluation system 100 in the fourth embodiment configured as described above, it is possible to improve the accuracy of an evaluation of the structure as in the first embodiment. Specifically, in the structure evaluation system 100 according to the fourth embodiment, the impacts are applied in the laser irradiation process of the irradiation device with respect to a region of the road surface where it is difficult to apply the impacts with the traveling sections W of the vehicle 10. Therefore, because elastic wave rays WL can pass through a region where it is difficult for the elastic wave rays WL to pass when impacts are applied by the traveling sections W of the vehicle 10, it is possible to evaluate the deterioration state even with respect to a region where it is difficult to evaluate the deterioration state. Thus, it is possible to improve the accuracy of an evaluation of the structure.

A modified example of the fourth embodiment will be described.

In the above-described embodiment, a configuration in which the irradiation device serving as the impact imparting unit 15c is arranged between the traveling sections W (treads) of the vehicle 10 has been described. The irradiation device serving as the impact imparting unit 15c may be arranged outside of the traveling sections W of the vehicle 10 or may be configured to perform the laser irradiation process.

Hereinafter, modified examples of the first to fourth embodiments will be described.

The signal processor 30 may be provided in the structure evaluation apparatus 40.

In each of the above-described embodiments, a configuration in which the plurality of sensors 20-1 to 20-n are connected to one signal processor 30 has been described. The structure evaluation system 100 includes a plurality of signal processors 30 and each sensor 20 may be connected to a different signal processor 30.

Some of functional units included in the structure evaluation apparatus 40 may be provided in another device. For example, the display 44 included in the structure evaluation apparatus 40 may be provided in another device. In the case of the configuration in this way, the structure evaluation apparatus 40 transmits an evaluation result to the other device including the display 44. The other device including the display 44 displays the evaluation result that has been received.

According to at least one embodiment described above, it is possible to improve the accuracy of an evaluation of a structure by providing the impact imparting unit 15 configured to apply impacts to a second region different from a first region of a structure to which traveling sections W of a vehicle, which travels on the structure, apply impacts; the plurality of sensors 20 configured to detect elastic waves generated in the structure; the position locator 423 configured to locate a position of a source of the elastic waves on the basis of the elastic waves detected by each of the plurality of sensors 20; and the evaluator 425 configured to evaluate a deterioration state of the structure on the basis of a position location result of the position locator 423.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structure evaluation system comprising:
    an impact imparting unit configured to apply impacts to a second region which is different from a first region of a structure on which a vehicle travels;
    a plurality of sensors configured to detect elastic waves generated in the structure;
    a position locator configured to locate a position of a source of the elastic waves on the basis of the elastic waves detected by each of the plurality of sensors; and
    an evaluator configured to evaluate a deterioration state of the structure on the basis of a position location result of the position locator,
    wherein the impact imparting unit is a water spraying device for performing a water spraying process or an irradiation device for applying the impacts by irradiating the structure with a laser,
    when the impact imparting unit is the water spraying device, the impact imparting unit applies the impacts to the second region by outputting water in such a way that trajectory of the water spray meanders,
    when the impact imparting unit is the irradiation device, the impact imparting unit applies the impacts to the second region by operating the laser so that laser trajectory meanders.

2. The structure evaluation system according to claim 1, wherein the impact imparting unit applies the impacts at a position between traveling sections of the vehicle or outside of the traveling sections of the vehicle in the second region.

3. A structure evaluation method comprising:
    applying impacts to a second region which is different from a first region of a structure on which a vehicle travels;
    detecting elastic waves generated in the structure;
    locating a position of a source of the elastic waves on the basis of the detected elastic waves; and
    evaluating a deterioration state of the structure on the basis of a position location result,
    wherein the impacts are applied by a water spraying device for performing a water spraying process or an irradiation device for applying the impacts by irradiating the structure with a laser,
    when the impacts are applied by the water spraying device, the water spraying device applies the impacts to the second region by outputting water in such a way that trajectory of the water spray meanders,
    when the impacts are applied by the irradiation device, the irradiation device applies the impacts to the second region by operating the laser so that laser trajectory meanders.

* * * * *